US010711794B2

United States Patent
Propheter-Hinckley (10) Patent No.: US 10,711,794 B2
(45) Date of Patent: Jul. 14, 2020

(54) AIRFOIL WITH GEOMETRICALLY SEGMENTED COATING SECTION HAVING MECHANICAL SECONDARY BONDING FEATURE

(71) Applicant: United Technologies Corporation, Farmington, CT (US)

(72) Inventor: Tracy A. Propheter-Hinckley, Manchester, CA (US)

(73) Assignee: RAYTHEON TECHNOLOGIES CORPORATION, Farmington, MI (US)

( * ) Notice: Subject to any disclaimer, the term of this patent is extended or adjusted under 35 U.S.C. 154(b) by 517 days.

(21) Appl. No.: 15/354,081

(22) Filed: Nov. 17, 2016

(65) Prior Publication Data

US 2018/0135435 A1    May 17, 2018

(51) Int. Cl.
| | |
|---|---|
| *F04D 29/38* | (2006.01) |
| *F01D 5/28* | (2006.01) |
| *F01D 9/04* | (2006.01) |
| *F04D 29/54* | (2006.01) |
| *F02C 3/04* | (2006.01) |

(52) U.S. Cl.
CPC ............ *F04D 29/388* (2013.01); *F01D 5/28* (2013.01); *F01D 5/288* (2013.01); *F01D 9/041* (2013.01); *F04D 29/541* (2013.01); *F02C 3/04* (2013.01); *F05D 2220/32* (2013.01); *F05D 2240/12* (2013.01); *F05D 2240/30* (2013.01); *F05D 2240/35* (2013.01); *F05D 2300/611* (2013.01)

(58) Field of Classification Search
CPC .......... F01D 5/147; F01D 5/141; F01D 5/286; F01D 5/289; F05D 2230/90; F05D 2260/95
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |
| 4,247,259 A | 1/1981 | Saboe et al. |
| 4,396,349 A | 8/1983 | Hueber |

(Continued)

FOREIGN PATENT DOCUMENTS

| | | |
|---|---|---|
| EP | 0158307 | 10/1985 |
| EP | 0764764 | 3/1997 |

(Continued)

OTHER PUBLICATIONS

European Search Report for European Patent Application No. 17202395.4 completed May 3, 2018.

(Continued)

*Primary Examiner* — Kayla Mccaffrey
*Assistant Examiner* — John S Hunter, Jr.
(74) *Attorney, Agent, or Firm* — Carlson, Gaskey & Olds, P.C.

(57) ABSTRACT

An airfoil includes an airfoil body that has a geometrically segmented coating section. The geometrically segmented coating section includes a wall that has an outer side. The outer side includes an array of cells and there is a coating disposed in the array of cells. The cells include respective secondary mechanical bonding features that secure the coating to the wall.

18 Claims, 4 Drawing Sheets

(56) References Cited

U.S. PATENT DOCUMENTS

| | | | |
|---|---|---|---|
| 4,639,388 A * | 1/1987 | Ainsworth | B32B 15/04 428/117 |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,167,573 B2 * | 5/2012 | Merrill | F01D 5/288 416/224 |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2008/0159850 A1 | 7/2008 | Tholen et al. | |
| 2010/0136258 A1 | 6/2010 | Strock et al. | |
| 2016/0090851 A1 | 3/2016 | Carr et al. | |

FOREIGN PATENT DOCUMENTS

| | | |
|---|---|---|
| EP | 1764481 | 3/2007 |
| EP | 2105579 | 9/2009 |
| EP | 2275645 | 1/2011 |
| EP | 2325347 | 5/2011 |
| EP | 2853688 | 4/2015 |
| GB | 2272453 | 5/1994 |
| JP | 61066802 | 4/1986 |
| JP | 05321602 | 12/1993 |
| WO | 2016133579 | 8/2016 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.
European Search Report for European Patent Application No. 19206015.0 completed Dec. 16, 2019.

* cited by examiner

AIRFOIL WITH GEOMETRICALLY SEGMENTED COATING SECTION HAVING MECHANICAL SECONDARY BONDING FEATURE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil body that has a geometrically segmented coating section. The geometrically segmented coating section has a wall that has an outer side. The outer side has an array of cells, and a coating is disposed in the array of cells. The cells include respective secondary mechanical bonding features securing the coating to the wall.

In a further embodiment of any of the foregoing embodiments, the secondary mechanical bonding features include posts in the cells.

In a further embodiment of any of the foregoing embodiments, the posts are centered in the cells.

In a further embodiment of any of the foregoing embodiments, the posts are shorter than the cells.

In a further embodiment of any of the foregoing embodiments, the secondary mechanical bonding features include post holes in bottomsides of the cells In a further embodiment of any of the foregoing embodiments, the secondary mechanical bonding features include ribs in the cells.

In a further embodiment of any of the foregoing embodiments, the ribs are on the bottoms of the cells.

In a further embodiment of any of the foregoing embodiments, the ribs in each of the cells are unidirectionally oriented.

In a further embodiment of any of the foregoing embodiments, the ribs in a first portion of the cells are unidirectionally oriented in a first direction and the ribs in a second portion of the cells are unidirectionally oriented in a second direction that is non-parallel to the first direction.

In a further embodiment of any of the foregoing embodiments, the secondary mechanical bonding features include holes defined, at least in part, by cell sidewalls of the cells.

In a further embodiment of any of the foregoing embodiments, a ratio of a number of the holes to a number of the cells is greater than one.

In a further embodiment of any of the foregoing embodiments, the holes are sloped.

In a further embodiment of any of the foregoing embodiments, the secondary mechanical bonding features include undercuts in cell sidewalls of the cells.

In a further embodiment of any of the foregoing embodiments, the cells sidewalls also include overcuts that taper to tops of the cell sidewalls.

In a further embodiment of any of the foregoing embodiments, the cells are defined by cell sidewalls that include spaced-apart columns, and the secondary mechanical bonding features include gaps between the columns In a further embodiment of any of the foregoing embodiments, the columns have a common spacing size.

In a further embodiment of any of the foregoing embodiments, the secondary mechanical bonding features are selected from the group consisting of posts in the cells, post holes in bottomsides of the cells, ribs in the cells, holes defined at least in part by cell sidewalls of the cells, undercuts in cell sidewalls of the cells, gaps between spaced-apart columns of cell sidewalls of the cells, and combinations thereof.

A gas turbine engine according to an example of the present disclosure includes a compressor section, a combustor in fluid communication with the compressor section, and a turbine section in fluid communication with the combustor. One of the turbine section or the compressor section has an airfoil that has an airfoil body that includes a geometrically segmented coating section. The geometrically segmented coating section includes a wall that has an outer side. The outer side includes an array of cells, and a coating is disposed in the array of cells. The cells include respective secondary mechanical bonding features securing the coating to the wall.

In a further embodiment of any of the foregoing embodiments, the secondary mechanical bonding features are selected from the group consisting of posts in the cells, post holes in bottomsides of the cells, ribs in the cells, holes defined at least in part by cell sidewalls of the cells, undercuts in cell sidewalls of the cells, gaps between spaced-apart columns of cell sidewalls of the cells, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
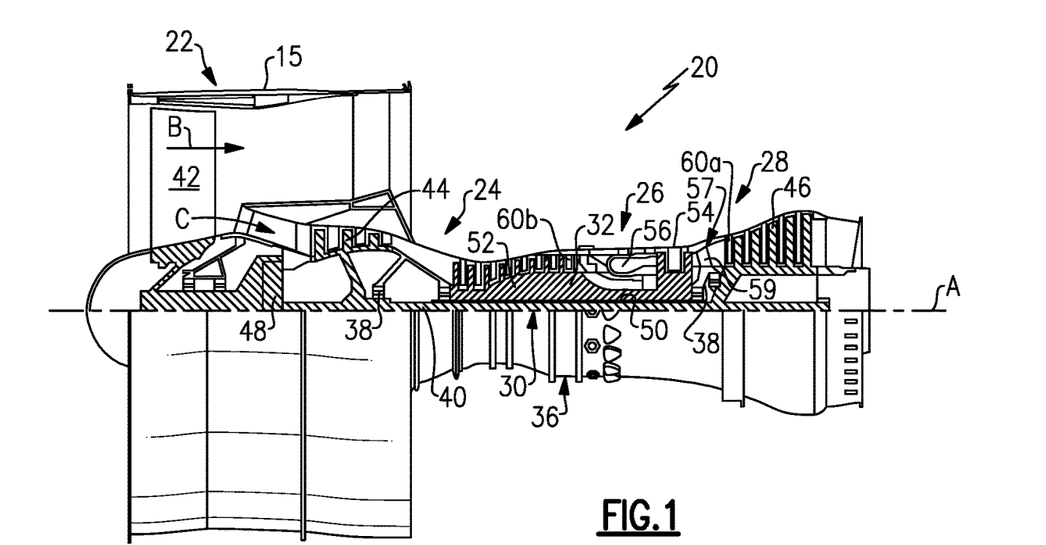
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
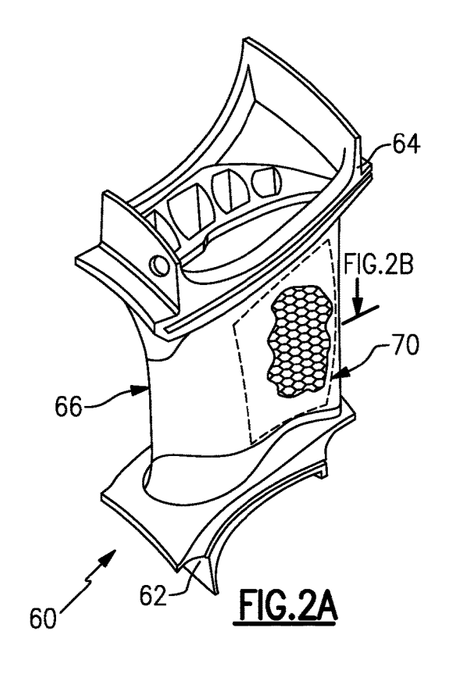
FIG. 2A illustrates an example airfoil of the gas turbine engine.
Figure 2B:
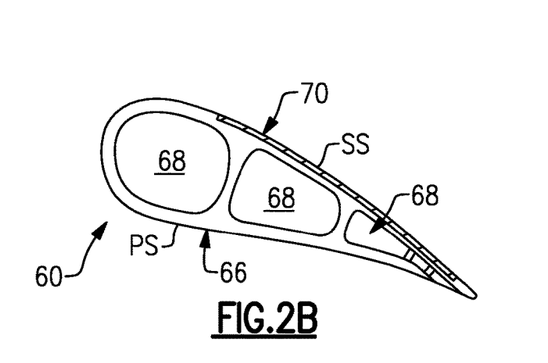
FIG. 2B illustrates a sectioned view of the airfoil of FIG. 2A.

FIG. 2A illustrates one such component, namely an airfoil 60. FIG. 2B illustrates a sectioned view of the airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils that are exposed to high temperatures.

The airfoil 60 includes a body which generally includes inner and outer platforms 62/64 and an airfoil section 66 that extends radially between the inner and outer platforms 62/64. The airfoil section 66 may be hollow and can include one or more internal passages 68. A passage can include a cavity, a channel, or the like.

To enhance the temperature resistance capability of the airfoil 60, the airfoil 60 includes a geometric segmented coating section 70. The coating section 70 may be integral with the airfoil section 66, but could alternatively be a segment or panel that forms a portion of the airfoil section 66. In this example, the coating section 70 is located on a suction side (SS) of the airfoil section 66. Alternatively or additionally, a coating section 70 could also be provided on the pressure side (PS) of the airfoil section 66. As will be described in further detail below, the coating section 70 includes a segmented structure to enhance temperature resistance capability of the airfoil 60.

Figure 3A:
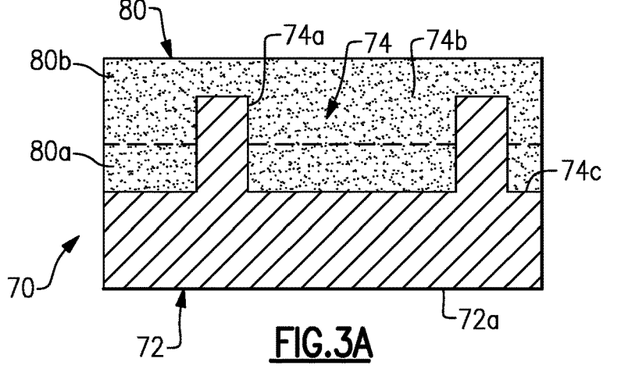
FIG. 3A illustrates a sectioned view through a segmented coating section of the airfoil.
Figure 3B:
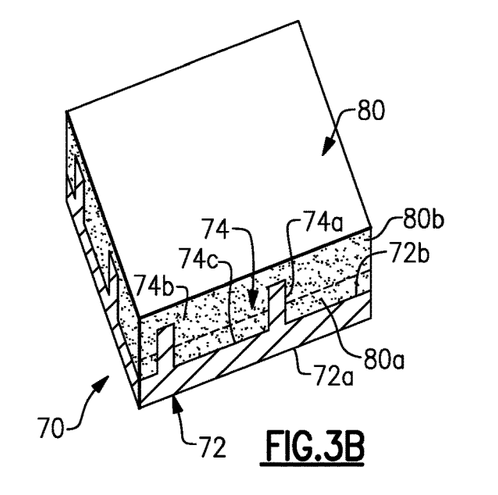
FIG. 3B illustrates a perspective view of the segmented coating section of FIG. 3A.
Figure 4:
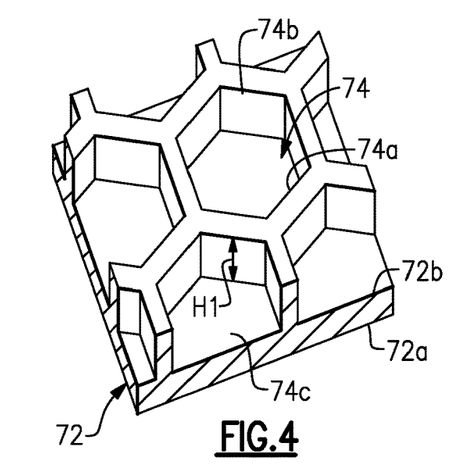
FIG. 4 illustrates an isolated view of the wall of the segmented coating section, without the coating.

FIG. 3A illustrates a sectioned view through a representative portion of the coating section 70, and FIG. 3B illustrates a sectioned perspective view of the coating section 70. The coating section 70 includes a wall 72. The wall 72 includes a first side 72a that will most typically border the passage 68 and a second side 72b that is opposite the first side 72a. The second side 72b includes an array of cells 74 defined by cell sidewalls 74a. The cells 74 have an open cell topside 74b and a cell bottomside 74c formed by a portion of the wall 72. The array is a repeating geometric pattern of one or more cell geometries. In this example, the cell sidewalls 74a have a uniform thickness. As shown in the isolated view of the wall 72 in FIG. 4, the cells 74 are hexagonal. Alternatively, the cells 74 are circular, ovular, other polygonal geometry, or mixed cell geometries.

A coating 80 is disposed in the array of cells 74. The cells 74 mechanically facilitate bonding of the coating 80 on the wall 72. The coating 80 is a barrier coating, such as a thermal barrier or environmental barrier, which is formed of a ceramic material. A ceramic material is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. The coating 80 may be a monolayer coating but more typically will be a multi-layer coating. For instance, the coating 80 has a first coating layer 80a and a second coating layer 80b. In this example, the second coating layer 80b is a topcoat.

The ceramic material of the coating 80 provides thermal and/or environmental resistance. As an example, the ceramic material may include or may be yttria stabilized with zirconia, hafnia, and/or gadolinia, gadolinia zirconate, molybdate, alumina, or combinations thereof.

The coating 80 may also include a bond coat for attaching the ceramic material to the wall 72 and cells 74. The wall 72 and cells 74 may be formed of an alloy. Example alloys may include, but are not limited to, nickel alloys, cobalt alloys, a nickel alloy coated with cobalt or cobalt alloy, or non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 74a also facilitate reducing internal stresses in the coating 80 that may occur from sintering at relatively high surface temperatures during use in the engine 20. The sintering may result in partial melting, densification, and diffusional shrinkage of the coating 80 and thereby induce internal stresses. The cell sidewalls 74a serve to produce faults in at least the portion of the coating 80. The faults provide locations for releasing energy associated with the internal stresses (e.g., reducing shear and radial stresses). That is, the energy associated with the internal stresses may be dissipated in the faults such that there is less energy available for causing delamination cracking between the coating 80 and the underlying wall 72.

The coating section 70 may be formed using several different fabrication techniques. As an example, the wall 72 may be fabricated by investment casting, additive manufacturing, brazing, or combinations thereof, but is not limited to such techniques. For instance, the cells 74 can be separately fabricated and brazed to the remaining portion of the wall 72, which can be investment cast or additively fabricated. Alternatively, the cells 74 can be formed by other techniques, such as depositing an alloy coating and removing sections of the alloy coating by machining, electro-discharge machining (EDM), or other removal process.

To produce the coating 80, ceramic coating material is deposited over the cells 74. The deposition process can include, but is not limited to, plasma spray or physical vapor deposition. In one example, plasma spray is used to produce a more durable version of the coating 80. For instance, the coating 80 has a laminar microstructure. The laminar microstructure may include grains of ceramic material that have a high aspect ratio. The laminar microstructure is a product of the plasma spray process, in which droplets of melted or partially melted ceramic material are sprayed onto the cells 74. Upon impact, the droplets flatten and solidify, yielding the laminar microstructure. There may be voids or pores among the grains; however, the coating 80 is substantially fully dense.

The ceramic coating material fills or substantially fills the cells 74 and is deposited in a thickness that is greater than the height H1 of the cell sidewalls 74a. The height H1 is the linear distance between the cell topside 74b and the cell bottomside 74c along a line orthogonal to the cell bottomside 74c at the cell sidewall 74a. At this stage, the surface of the coating may have contours from the underlying cells 74. If such contours are undesired, the surface may be machined, ground, or abraded flat. For instance, the surface is reduced down to or close to the tops of the cell sidewalls 74a.

Figure 5A:
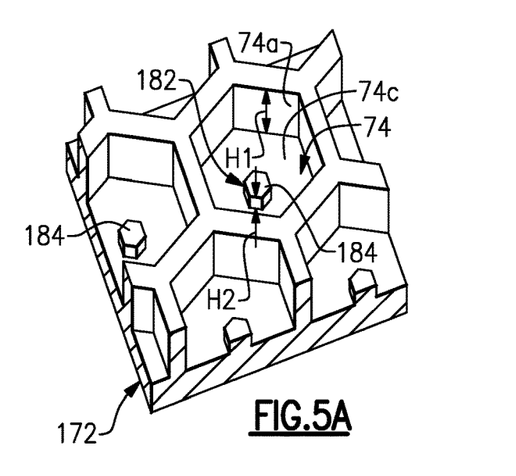
FIG. 5A illustrates an isolated view of another example wall of a segmented coating section, without the coating, and which has posts as secondary bonding features.

FIG. 5A illustrates an isolated view of another example of the wall 172. In this disclosure, like reference numerals designate like elements where appropriate and reference numerals with the addition of one-hundred or multiples thereof designate modified elements that are understood to incorporate the same features and benefits of the corresponding elements. In this example, the cells 74 include respective secondary mechanical bonding features 182. The features 182 may be formed integrally with the wall 172, such as by casting or additive manufacturing, may be separately formed and then bonded to the wall 172, or may be machined (e.g., by EDM) from an initially solid portion of the wall 172. Most typically, the features 182 will be formed of the same material as the wall 172, such as the alloys described above.

The features 182 facilitate securing the coating 80 to the wall 172. That is, the presence of the cells 74 provides a first mechanism of bonding the coating 80 to the wall 172 and the features 182 provide a second, additional mechanism of bonding the coating 80 to the wall 172. The enhanced bonding provided by the cells 74 and features 182 thus provide a high level of resistance to spallation of the coating 80, such as at higher temperature locations on the airfoil 60. In turn, greater spallation resistance may reduce the need for bleed air for cooling or enable use of higher temperature bleed air that is less of an efficiency penalty.

In the illustrated example, the features 182 are posts 184 in the cells 74. Each cell 74 has a single post 184, although modified embodiments can include multiple posts 184 in each cell 74. The posts 184 provide additional surface area, in comparison to having no posts, for the coating 80 to adhere to. In this regard, the geometry of the posts 184 can be selected to provide more or less additional surface area, to tailor the degree of additional bonding provided by the features 182. In the example shown, the posts 184 have a hexagonal columnar geometry. Alternatively, the posts 184 may have a circular columnar geometry, an ovular columnar geometry, other polygonal columnar geometry, or mixed columnar geometries.

Figure 5B:
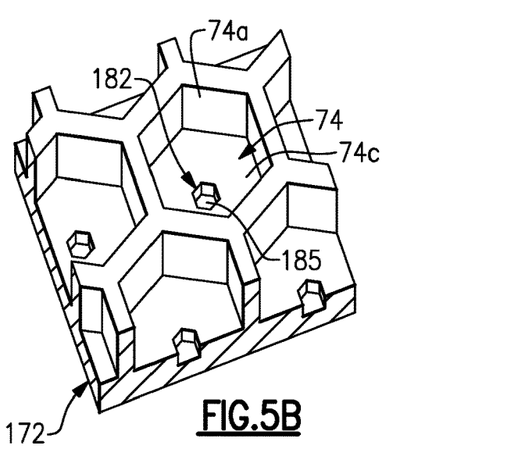
FIG. 5B illustrates an example wall of a segmented coating section, without the coating, and which has post holes as secondary bonding features.

For a single post 184, the post 184 may be centered in the cell 74 to facilitate uniform bonding with the coating 80. For multiple posts 184, the posts 184 may be symmetrically arranged in the cell 74. Additionally, the posts 184 may also be differentiated from the cell sidewalls 74a by height. For instance, the posts 184 have a common height H2 that is less than the height H1 of the cell sidewalls 74a. The posts 184 are thus shorter than the cell sidewalls 74a. The shorter height of the posts 184 ensures that the posts 184 are completely embedded in the coating 80. In further examples, the posts 184 may vary in height among multiple common heights to provide multiple surface areas for bonding. In one variation illustrated in FIG. 5B, rather than posts that project from the bottomside 74c, the features 182 are post holes 185 that are recessed into the bottomside 74c.

Figure 6:
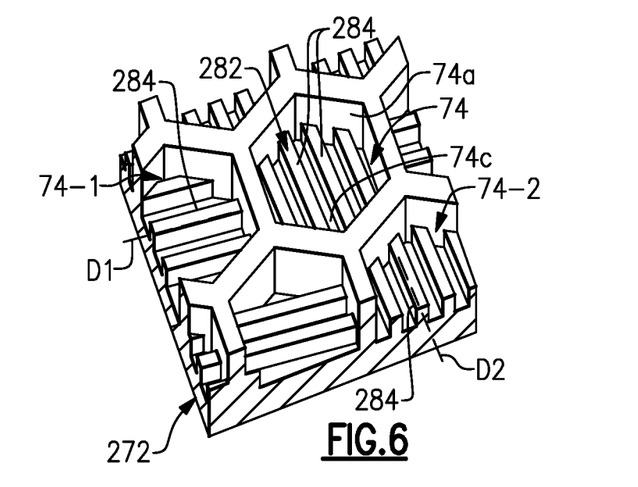
FIG. 6 illustrates an isolated view of another example wall of a segmented coating section, without the coating, and which has ribs as secondary bonding features.

FIG. 6 illustrates an isolated view of another example of the wall 272. In this example, the cells 74 include respective secondary mechanical bonding features 282 that are ribs 284 in the cells 74. The ribs 284 may be formed integrally with the wall 272, such as by casting or additive manufacturing, may be separately formed and then bonded to the wall 272, or may be machined (e.g., by EDM) from an initially solid portion of the wall 272. Most typically, the ribs 284 will be formed of the same material as the wall 272, such as the alloys described above.

Like the posts 184, the ribs 284 provide additional surface area, in comparison to having no ribs, for the coating 80 to adhere to. The geometry of the ribs 284 can be selected to provide more or less additional surface area, to tailor the degree of additional bonding provided by the features 282. In the example shown, the ribs 284 have a rectangular profile geometry. Alternatively, the ribs 284 may have a rounded profile geometry, other polygonal profile geometry, or mixed profile geometries.

Each cell 74 may include a single rib 284 or multiple ribs 284. In the example shown, there are multiple ribs 284 in each cell 74 and the ribs in each cell 74 are unidirectionally oriented. For instance, the ribs 284 in a first portion of the cells 74 (represented by cell 74-1) are unidirectionally oriented along direction D1, and the ribs 284 in a second portion of the cell 74 (represented by cell 74-2) are unidirectionally oriented along direction D2. The directions D1 and D2 are non-parallel. In one further example, the directions D1 and D2 are perpendicular. In further examples, the directions D1 and D2 are perpendicular within about five to forty-five degrees due to fabrication tolerances or curvatures in the wall 272.

The non-parallel directions further facilitate the bonding between the wall 272 and the coating 80. For instance, the ribs 284 are mechanically interlocked with the coating 80. The ribs 284 in the first direction D1 provide good interlocking along directions orthogonal to the direction D1, while the ribs 284 in the second direction D2 provide good interlocking along directions orthogonal to the direction D2. The non-parallel directions thus provide interlocking in two different directions, which facilitates a secure bond.

The non-parallel directions may also facilitate crack arrest in the coating 80. For instance, a crack propagating in a direction orthogonal to the directions D1 or D2 will encounter the ribs 284, thus increasing the potential for crack arrest, or at least slowing propagation of the crack.

Figure 7A:
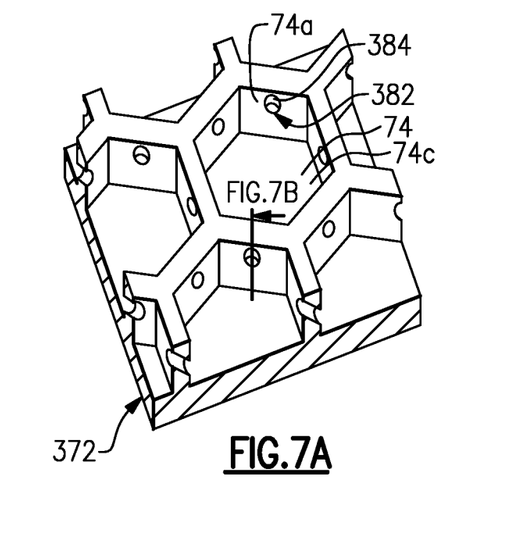
FIG. 7A illustrates an isolated view of another example wall of a segmented coating section, without the coating, and which has cell sidewall holes as secondary bonding features.

FIG. 7A illustrates an isolated view of another example of the wall 372. In this example, the cells 74 include respective secondary mechanical bonding features 382 that are holes 384 in the cell sidewalls 74a. The holes 384 may be formed integrally with the wall 372, such as by casting, additive manufacturing, or may be separately machined or cut into the wall 372 (e.g., by EDM).

Like the posts 184 and ribs 284, the holes 384 also provide additional surface area, in comparison to having no holes, for the coating 80 to adhere to and interlock with. The geometry of the holes 384 can be selected to provide more or less additional surface area, to tailor the degree of additional bonding provided by the features 382. In the example shown, the holes 384 have a circular profile geometry. Alternatively, the holes 384 may have ovular profile geometry, polygonal profile geometry, or mixed profile geometries.

Each cell 74 may include a single hole 384 or multiple holes 384. In the example shown, there are multiple holes 384 in each cell 74. For instance, in the coating section 70, there are a total number of the holes 384 and a total number of the cells 74 (that have holes 384). The coating section 70 has a ratio of the number of the holes 384 to the number of the cells 74 that is greater than one. The holes 384 may be uniformly distributed or spaced around the cells 74. For example, each facet of the cell sidewalls 74a may include a hole 384. As an example, a hexagonal cell 74 has six facets and thus six holes 384. Generally the holes 384 may be centered on the facets, however, in modified examples the holes 384 could be shifted toward the cell topside 74b or cell bottomside 74c.

Figure 7B:
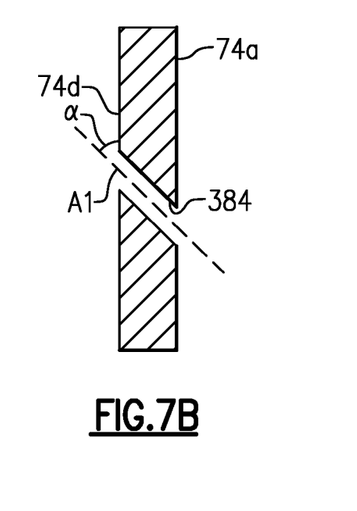
FIG. 7B illustrates a sectioned view of a cell of FIG. 7A.

As shown in the sectioned view in FIG. 7B, the holes 384 may be sloped along central hole axis A1. The slope is relative to the orientation of the cell sidewall 74a. For example, the reference for the slope may be an inside surface 74*d* of the cell sidewall 74*a* adjacent the hole 384, which forms an angle a (alpha) with the hole axis A1. The holes 384 will most typically be sloped toward the open cell topside 74*b* so that coating material can, at least partially, deposit into the holes 384, thus mechanically interlocking the coating 80 with the holes 384. In this regard, an individual cell 74 will have some holes 384 that slope toward the open cell topside 74*b* of that cell 74 and some holes 384 that slope toward the cell bottomside 74*c* of that cell 74. Of course, the holes 384 that slope toward the cell bottomside 74*c* of that cell 74 will slope toward the cell topside 74*b* of the neighboring cell 74. In a hexagonal or other polygonal cell geometry, the facets of the cell 74 may alternate holes 384 that slope toward the cell topside 74*b* and that slope toward the cell bottomside 74*c*, to facilitate more uniform mechanical interlocking with the coating 80.

Figure 8:
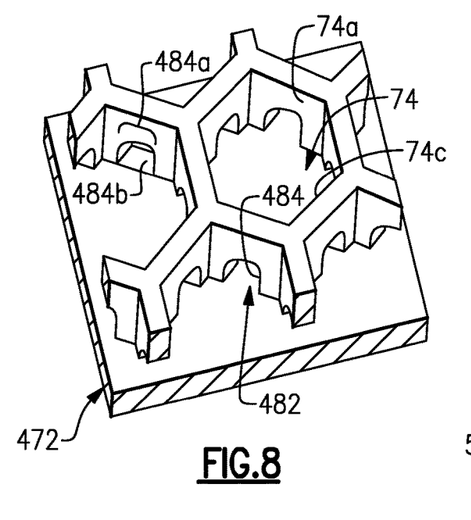
FIG. 8 illustrates an isolated view of another example wall of a segmented coating section, without the coating, and which has irregular holes as secondary bonding features.

FIG. 8 illustrates an isolated view of another example of the wall 472. In this example, the cells 74 include respective secondary mechanical bonding features 482 that are also holes 484. The holes 484 may be formed integrally with the wall 472, such as by casting or additive manufacturing, or may be separately machined or cut into the wall 472 (e.g., by EDM).

Unlike the holes 384 that are within the cell sidewalls 74*a*, the holes 484 are defined by the cell sidewalls 74 and the cell bottomside 74*c*. The holes 484 thus have an irregular geometry profile. Like the posts 184, ribs 284, and holes 384, the holes 484 also provide additional surface area, in comparison to having no holes, for the coating 80 to adhere to and interlock with. The irregular geometry profile of the holes 484 can be selected to provide more or less additional surface area, to tailor the degree of additional bonding provided by the features 482. In the example shown, the holes 484 have a partial- or semi-circular portion 484*a* and a flat portion 484*b*, thus providing a mixed curvilinear profile. Alternatively, the holes 484 may have other mixed curvilinear geometries or other irregular geometries. The holes 484 may be provided in the ratio and arrangements as described above for the holes 384, or may be sloped as described above for the holes 384.

Figure 9:
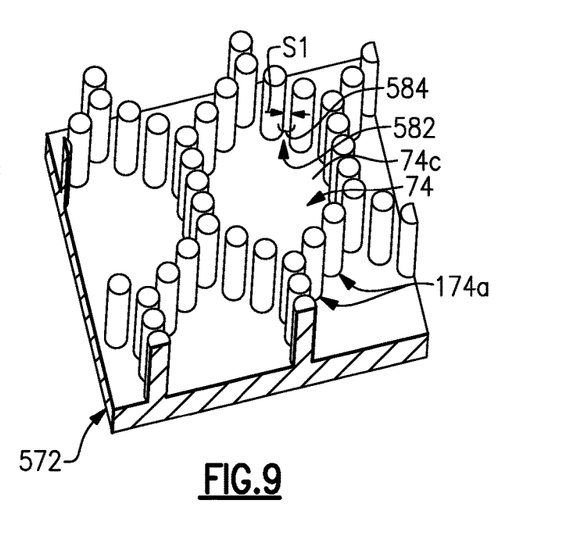
FIG. 9 illustrates an isolated view of another example wall of a segmented coating section, without the coating, and which has column gaps as secondary bonding features.

FIG. 9 illustrates an isolated view of another example of the wall 572. In this example, rather than the solid cell sidewalls, the cells 74 are defined by cell sidewall columns 174*a*. The columns 174*a* may be formed integrally with the wall 572, such as by casting or additive manufacturing, may be separately formed and then bonded to the wall 572, or may be machined (e.g., by EDM) from an initially solid portion of the wall 572. Most typically, the columns 174*a* will be formed of the same material as the wall 572, such as the alloys described above.

The columns 174*a* are spaced-apart from each other and are arranged in a pattern that forms the cells 74. For instance, the columns 174*a* are arranged to provide a hexagonal pattern, or any of the patterns described herein for the cells 74.

The cells 74 include respective secondary mechanical bonding features 582. In this example, the features 582 are gaps 584 between the columns 174*a*. Like the posts 184, ribs 284, holes 384, and holes 484, the gaps 584 also provide additional surface area, in comparison to having no gaps, for the coating 80 to adhere to and interlock with. The size of the gaps 584 and geometry of the columns 174*a* can be selected to provide more or less additional surface area, to tailor the degree of additional bonding provided by the features 582.

In the example shown, the columns 174*a* are uniform diameter circular columns Alternatively, the columns 174*a* may be uniform ovular columns, uniform hexagonal columns, other uniform polygonal geometry columns, mixed uniform geometry columns, or tapered columns of any of the aforementioned geometries which taper from the cell bottomside 74*c* toward the cell topside 74*b*.

The columns 174*a* have a common spacing size S1, which may facilitate more uniform bonding with the coating 80. That is, the spacing size S1 between each column 174*a* and each immediate neighboring column 174*a* is the approximately equal. In one further example, the spacing S1 is taken at the bottom of the columns 174*a*, along the cell bottomside 74*c*. As will be appreciated, the exact spacing S1 may vary within manufacturing tolerances.

Figure 10:
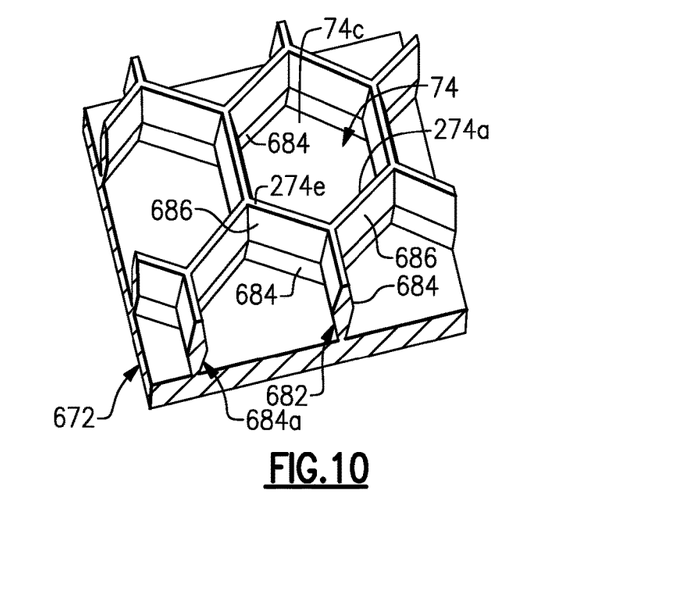
FIG. 10 illustrates an isolated view of another example wall of a segmented coating section, without the coating, and which has undercuts as secondary bonding features.

FIG. 10 illustrates an isolated view of another example of the wall 672. In this example, the cells 74 include respective secondary mechanical bonding features 682 that are undercuts 684 in the cell sidewalls 274*a*. The undercuts 684 may be formed integrally with the wall 672, such as by casting or additive manufacturing, or may be separately machined or cut into the wall 672 (e.g., by EDM).

The undercuts 684 provide undercut pockets 684*a* at the bottoms of the cell sidewalls 274*a*. Although the undercuts 684 may provide nominal additional surface area, in comparison to straight sidewalls, the undercuts 684 and undercut pockets 684*a* primarily facilitate a mechanical interlocking with the coating 80. The coating 80 deposits into the undercut pockets 684*a* and thus interlocks with the cell sidewalls 274*a*. The angle and geometry of the undercuts 684 can be selected to provide more or less interlocking, to tailor the degree of additional bonding provided by the features 682. For instance, higher angles (relative to a zero direction that is perpendicular to the cell bottomside 74*c*) provide larger volume undercut pockets 684*a* and correspondingly greater interlocking; and lower angles provide smaller volume undercut pockets 684*a* and correspondingly less interlocking.

In the example shown, the undercuts 684 are angled flat facets of the cell sidewalls 274*a*. The angled flat facets provide easy manufacturability. Additionally or alternatively, angled curved facets or angled compound flat/curved facets could be used.

The cell sidewalls 274*a* may additionally include overcuts 686 that taper to the tops or narrow top edges 274*e* of the cell sidewalls 274*a*. The overcuts 686 may be formed integrally with the wall 672, such as by casting or additive manufacturing, or may be separately machined or cut into the wall 672 (e.g., by EDM). In this example, the narrow top edges 274*e* are flat and generally parallel to the cell bottomside 74*c*. The taper of the overcuts 686 serves to enhance durability of the cell sidewalls 274*a*. For instance, as the coating 80 degrades and spalls, the cell sidewalls 274*a* may progressively become exposed in the core gas path of the engine. The taper of the overcuts 686 reduces the thickness of the cell sidewalls 274*a*, in comparison to straight sidewalls, which reduces the surface area of the cell sidewalls 274*a* that is exposed. The reduced surface area in turn reduces the amount of the cell sidewalls 274*a* that is exposed for degradation, such as by corrosion, erosion, or both. Similar to the undercuts 684, the overcuts 686 are angled flat facets of the cell sidewalls 274*a*. The angled flat facets provide easy manufacturability. Additionally or alternatively, angled curved facets or angled compound flat/curved facets could be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil body having a geometrically segmented coating section, the geometrically segmented coating section including
a wall having an outer side, the outer side including an array of cells, and
a coating disposed in the array of cells, wherein the array of cells includes secondary mechanical bonding features securing the coating to the wall, the secondary mechanical bonding features including multiple ribs in each of the cells of the array of cell, wherein the multiple ribs in each of the cells of the array of cells are unidirectionally oriented.

2. The airfoil as recited in claim 1, wherein the secondary mechanical bonding features include posts in the array of cells.

3. The airfoil as recited in claim 2, wherein the posts are centered in the array of cells.

4. The airfoil as recited in claim 2, wherein the posts are shorter than the array of cells.

5. The airfoil as recited in claim 1, wherein the secondary mechanical bonding features include post holes in bottomsides of the array of cells.

6. The airfoil as recited in claim 1, wherein the array of cells define cell bottoms and the ribs are on the cell bottoms.

7. The airfoil as recited in claim 1, wherein the multiple ribs in a first cell of the array of cells are unidirectionally oriented in a first direction and the multiple ribs in a second cell of the array of cells are unidirectionally oriented in a second direction that is non-parallel to the first direction.

8. The airfoil as recited in claim 1, wherein the secondary mechanical bonding features include holes defined, at least in part, by cell sidewalls of the array of cells.

9. The airfoil as recited in claim 8, wherein a ratio of a number of the holes to a number of the array of cells is greater than one.

10. The airfoil as recited in claim 8, wherein the holes are sloped.

11. The airfoil as recited in claim 1, wherein the secondary mechanical bonding features include undercuts in cell sidewalls of the array of cells.

12. The airfoil as recited in claim 11, wherein the cell sidewalls also include overcuts that taper to tops of the cell sidewalls.

13. The airfoil as recited in claim 1, wherein the array of cells are defined by cell sidewalls that include spaced-apart columns, and the secondary mechanical bonding features include gaps between the spaced-apart columns.

14. The airfoil as recited in claim 13, wherein the spaced-apart columns have a common spacing size.

15. The airfoil as recited in claim 1, wherein the multiple ribs in each of the cells of the array of cells are solid.

16. The airfoil as recited in claim 1, wherein each rib of the multiple ribs is a solid elongated ridge.

17. The airfoil as recited in claim 1, wherein the wall defines the multiple ribs in each of the cells of the array of cells.

18. A gas turbine engine comprising:
a compressor section;
a combustor in fluid communication with the compressor section; and
a turbine section in fluid communication with the combustor,
at least one of the turbine section or the compressor section including an airfoil having an airfoil body including a geometrically segmented coating section, the geometrically segmented coating section including
a wall having an outer side, the outer side including an array of cells, and
a coating disposed in the array of cells, wherein the array of cells includes secondary mechanical bonding features securing the coating to the wall, the secondary mechanical bonding features including multiple ribs in each of the cells of the array of cells, wherein the multiple ribs in each of the cells of the array of cells are unidirectionally oriented.

* * * * *